Patented Oct. 23, 1951

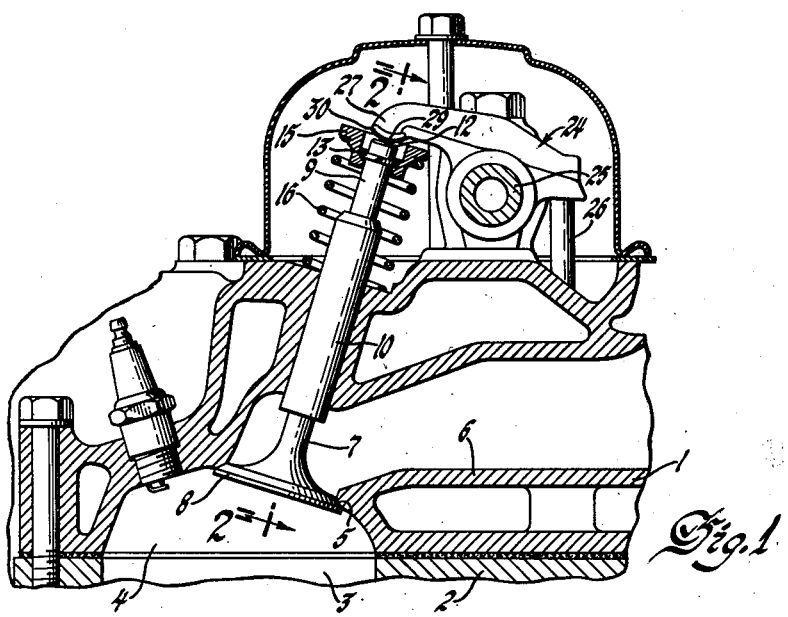

2,572,106

UNITED STATES PATENT OFFICE 2,572,106

VALVE ROTATING DEVICE

Frank C. Burrell, Detroit, Mich., assignor to General Motors Corporation, Detroit, Mich., a corporation of Delaware Application December 1, 1949, Serial No. 130,525

5 Claims. (Cl. 123—90)

1

This invention relates to poppet valves for internal combustion engines and the like and particularly to means for effecting axial rotation of the valve during engine operation.

It is the general and principal object of my invention to provide an improved means for effecting dependable rotation of such valves which requires but simple and inexpensive modification of the conventional valve operating parts.

A more specific object of the invention is to provide a valve rotating means wherein the conventional valve rocker or equivalent member for effecting operation of the valve effects the additional functions of releasing the valve from spring thrust and rotatively driving the valve while thus released.

In general, I accomplish these and other objects by arranging the valve operating member for separate or independent engagement with the valve and the usual spring return means, the engagement with the spring return means occurring in advance of the engagement with valve during valve opening movements and effecting the release of the valve from spring thrust to accommodate valve rotation, and the engagement with valve occurring off center with respect to the same to provide a valve rotating force.

In the drawing:

Figure 1 is a transverse sectional view of a portion of an overhead valve type internal combustion engine incorporating the valve rotating device of my invention.

Figure 2 is an enlarged fragmentary sectional view taken substantially on line 2—2 of Figure 1.

Figure 3 is an enlarged fragmentary view similar to Figure 1 showing, by means of broken and solid lines, relative positions of parts of my valve rotating device during operation.

Referring to the drawing, 1 designates a conventional cylinder head secured to a cylinder block 2 of an internal combustion engine, 3 being one cylinder in the block 2 and 4 a combustion chamber associated with one end of cylinder 3. In one wall of the combustion chamber is shown a conventional valve seat 5 defining the entrance to the passage 6 leading outwardly through the cylinder head from the combustion chamber. Further in accordance with conventional practice there is provided a valve 7 having a head 8 adapted to close on the seat 5 and having an integral stem 9 which is slidably and rotatably supported in a sleeve 10 fixed within the cylinder head 1. This stem terminates at its upper end with an end face 12 which is preferably though not necessarily flat, and just below this end face is a fixed abutment in the form of a collar 13 which is removably secured to the valve in any desired manner. As shown, this collar 13 is made in the form of a diametrically split ring, the two halves seating in a common annulus provided on the cylindrical periphery on the valve stem with their opposing ends slightly spaced apart as at 14. The generally ring-shaped member 15 serves as a washer to releasably transmit thrust from the spring 16 to the valve stem 9, the lower end of the spring resting on the top of the cylinder head surrounding the valve guide sleeve 10. This member 15 has an externally flanged upper portion 17 against which the upper end of the spring abuts at all times and an internally flanged lower portion 18 which is adapted to abut the bottom face of the collar 13. The portion 18 and the bore 19 immediately adjacent thereto journal on the valve stem 9 and collar 13, respectively, and accommodate sliding movement of the member 15 toward the valve head 8 in opposition to the spring to release the collar 13 and thus the valve stem 9 from spring thrust. When the parts are in their positions as shown in Figures 1 and 2 the spring thrust is being transmitted by the member 15 to the collar 13 on the valve stem, thereby holding the valve "closed," i. e. its head 8 in closing relation with the seat 5.

Movement of the valve in the opposite direction against the biasing effect of the spring 16 is accomplished by means of a rocker arm 24 mounted for oscillation on a rocker shaft 25 and driven by a push rod 26 from a cam, not shown. I have modified the driven end 27 of the rocker arm from that which is conventionally employed to provide portions thereon which are engageable independently with the valve spring retainer member 15 and the valve stem end face 12. At this end of the rocker arm I provide an arcuate-shaped foot or pad 29 of sufficient width to contact the upper face of the retainer member on both sides of the valve stem 9. Opposite the valve stem end face 12 and eccentric thereto, i. e. in offset relation to the longitudinal axis of the stem, is a relatively narrow arcuate-shaped projection 30. This eccentricity or offset relation, it will be noted, is longitudinal of the shaft 25 about which the rocker arm oscillates. A slight clearance (in the order of .002 inch) exists between the valve stem end face 12 and the projection 30 when the retainer 15 is in engagement with both the rocker arm pad 29 and the underside of the collar 13.

During operation, upon movement of the rocker arm 24 about its shaft 25 the pad 29 engages the valve spring retainer member 15 independently of the valve stem end face 12 and moves that member in opposition to the spring 16 a distance equal to the aforementioned clearance between the projection 30 and valve end face 12, the valve in the meantime tending to remain stationary by reason of its inertia. It will be noted that there is sufficient initial movement of the member 15 relative to the valve to effect the release of the valve stem at its abutment 13 from the retainer flange 18 during this portion of the stroke, whereupon the valve is then free to rotate. Continued movement of the rocker arm after the projection 30 engages the valve stem end face 12 forces the valve downwardly. The movement of the projection 30 defines an arc, as indicated at 35 in Figure 3, and the component of this arcuate movement transverse to the valve stem axis while the projection 30 is in engagement with the valve stem end face 12 provides a friction force for rotating the valve. By suitably arranging the geometry of the rocker arm and valve stem movement this lateral component of movement of the projection 30 will be realized to the maximum extent between the fully closed and fully opened positions of the valve, indicated in broken and solid lines, respectively, in Figure 3. Rotation of the valve will occur only during valve opening movements since during this time the inertia of the valve tends to cause the same to lag behind the speed of movement of the rocker arm 24 and the valve stem end face 12 is thus maintained in engagement with the projection 30. During valve closing movements the inertia effect of the valve is opposite, the valve tending to lag behind the speed of movement of the retainer member 15 as the latter returns the rocker arm to its initial valve opening position, and the flange 19 on this retainer thus is maintained in abutment with the undersurface on the collar 13 during this return stroke.

While I have shown my invention in a specific application to an internal combustion engine employing a rocker arm for driving the valve, it is believed that the invention is equally applicable to other means, such as continuously rotating cams or slidable wedges for actuating the valve and that the invention is not to be limited other than as is defined by the scope of the following claims.

I claim:

1. In an internal combustion engine, a poppet valve having a stem, stem guiding means accommodating axial reciprocation and rotation of the valve, a valve return spring seated at one end against the stem guiding means, a washer adjacent one end of the valve stem for retaining the opposite end of the spring, said washer being slidably carried by the valve stem for rotation and reciprocation relative thereto, an abutment on the valve stem against which the washer is normally urged by the spring, a valve operating rocker mounted for oscillatory movement about an axis laterally disposed from the valve stem and having an arm provided with end portions independently engageable with the stem and washer respectively, said stem engageable end portion being offset longitudinally of the rocker axis from the axis of the stem, there being a slight clearance between the end of the stem and its rocker arm end portion when the washer is in engagement with both its rocker arm end portion and the abutment on the stem.

2. In combination with a valve having a stem mounted for rotation about its longitudinal axis and terminating with an end face, an abutment on the stem below the end face, a member journaled on the stem below the abutment, resilient means normally urging the member against the abutment, valve operating means including an arm arranged for oscillation about and axis laterally disposed from the stem and terminating with a foot above the end face and member, said foot having respective surface portions arranged for independent engagement with the end face and member, the surface portion engageable with the end face being offset from the stem axis longitudinally of said axis of oscillation and being spaced from the end face when the member is in engagement with both the abutment and the foot.

3. In an internal combustion engine, a valve seat, a poppet valve having a stem mounted for axial rotation and reciprocation, an abutment on the stem, spring means normally in engagement with the abutment for yieldably urging the valve toward its seat, an arm rotatable about an axis laterally disposed from the stem for moving the valve away from its seat while holding the spring means out of engagement with the abutment, said arm being in substantially constant engagement with the spring means and having a portion independently engageable with the stem, said portion being offset longitudinally of the arm axis from the axis of the stem and disengaged from the stem when the spring means is in engagement with both the abutment and the arm, the inertia of the valve being effective to maintain the stem in engagement with said portion during movement of the valve away from its seat and to maintain the stem out of engagement with said portion during movement of the valve toward its seat.

4. In combination with a valve having an axis of rotation, a spring normally urging the valve toward closed position, a member retaining one end of the spring, an abutment on the valve against which said member is normally held by the spring, a valve operating element for rotating and moving the valve toward open position while holding said member out of engagement with the abutment, said element being in substantially constant engagement with said member and having a portion independently engageable with the valve, said portion being offset from said axis and having components of movement both longitudinally and transversely of said axis during valve operation, said portion being out of engagement with said valve when the member is in engagement with the abutment.

5. In combination with a rotatably and reciprocably driven stem, a spring normally urging the stem in one longitudinal direction, a member at one end of the spring adapted to releasably transmit thrust from the spring to the stem and accommodating rotation of the stem when the stem is released from spring thrust, a stem operating element for rotating and moving the stem in the opposite longitudinal direction while holding said member out of thrust transmitting relation with the stem, respective portions of said element being independently engageable with said member and stem and having components of movement longitudinally and transversely of the stem, the portion engageable with the stem being in offset relation to the axis of rotation of the stem and out of engagement with the stem when said member is in engagement with its engageable portion.

FRANK C. BURRELL.

REFERENCES CITED

The following references are of record in the file of this patent:

UNITED STATES PATENTS

| Number | Name | Date |
| --- | --- | --- |
| 846,077 | Wishon | Mar. 5, 1907 |
| 1,213,590 | Compton | Jan. 23, 1917 |
| 2,142,224 | Turlay | Jan. 3, 1939 |